United States Patent
Arroyo et al.

(10) Patent No.: US 9,760,512 B1
(45) Date of Patent: Sep. 12, 2017

(54) MIGRATING DMA MAPPINGS FROM A SOURCE I/O ADAPTER OF A SOURCE COMPUTING SYSTEM TO A DESTINATION I/O ADAPTER OF A DESTINATION COMPUTING SYSTEM

(71) Applicant: International Business Machines Corporation, Armonk, NY (US)

(72) Inventors: Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/299,620

(22) Filed: Oct. 21, 2016

(51) Int. Cl.
*G06F 13/28* (2006.01)
*G06F 9/455* (2006.01)
(Continued)

(52) U.S. Cl.
CPC .......... *G06F 13/28* (2013.01); *G06F 9/45558* (2013.01); *G06F 9/5077* (2013.01);
(Continued)

(58) Field of Classification Search
CPC .. G06F 13/28; G06F 13/4282; G06F 9/45558; G06F 9/455588; G06F 9/5077
See application file for complete search history.

(56) References Cited

U.S. PATENT DOCUMENTS

| | | |
|---|---|---|
| 7,209,994 B1 | 4/2007 | Klaiber et al. |
| 7,240,364 B1 | 7/2007 | Branscomb et al. |

(Continued)

FOREIGN PATENT DOCUMENTS

| | | |
|---|---|---|
| CN | 101488092 A | 7/2009 |
| CN | 104737138 A | 6/2015 |
| JP | 5001818 B | 8/2012 |

OTHER PUBLICATIONS

Ajila et al., "Efficient Live Wide Area VM Migration With IP Address Change Using Type II Hypervisor", 2013 IEEE 14th International Conference on Information Reuse and Integration (IRI2013), Aug. 2013, pp. 372-379, IEEE Xplore Digital Library (online), DOI: 10.1109/IRI.2013.6642495.

(Continued)

*Primary Examiner* — Nimesh G Patel
(74) *Attorney, Agent, or Firm* — Brandon C. Kennedy; Robert R. Williams; Kennedy Lenart Spraggins LLP

(57) ABSTRACT

A method of migrating DMA mappings from a source I/O adapter of a source computing system to a destination I/O adapter of a destination computing system, including: collecting, by a source hypervisor of the source computing system, DMA mapping information, wherein the source hypervisor supports operation of a logical partition executing on the source computing system and the logical partition is configured for DMA operations with the source I/O adapter utilizing the DMA mapping information; configuring, by a destination hypervisor of the destination computing system, the destination I/O adapter with DMA mappings based on the DMA mapping information collected by the source hypervisor; placing, by the destination hypervisor, the destination I/O adapter in an error state; migrating the logical partition from the source computing system to the destination computing system; and restarting the logical partition on the destination computing system, including recovering, by the logical partition, from the error state.

20 Claims, 7 Drawing Sheets

(51) Int. Cl.
*G06F 13/42* (2006.01)
*G06F 9/50* (2006.01)

(52) U.S. Cl.
CPC .. *G06F 13/4282* (2013.01); *G06F 2009/4557* (2013.01); *G06F 2009/45579* (2013.01); *G06F 2213/0026* (2013.01)

(56) References Cited

U.S. PATENT DOCUMENTS

| | | | |
|---|---|---|---|
| 7,613,898 B2 | 11/2009 | Haertel et al. | |
| 7,813,366 B2 | 10/2010 | Freimuth et al. | |
| 7,882,326 B2 | 2/2011 | Armstrong et al. | |
| 7,937,518 B2 | 5/2011 | Boyd et al. | |
| 7,984,262 B2 | 7/2011 | Battista et al. | |
| 8,219,988 B2 | 7/2012 | Armstrong et al. | |
| 8,321,722 B2 | 11/2012 | Tanaka et al. | |
| 8,327,086 B2 | 12/2012 | Jacobs et al. | |
| 8,429,446 B2 | 4/2013 | Hara et al. | |
| 8,533,713 B2 | 9/2013 | Dong | |
| 8,561,065 B2 | 10/2013 | Cunningham et al. | |
| 8,561,066 B2 | 10/2013 | Koch et al. | |
| 8,645,755 B2 | 2/2014 | Brownlow et al. | |
| 8,677,356 B2 | 3/2014 | Jacobs et al. | |
| 8,683,109 B2 | 3/2014 | Nakayama et al. | |
| 8,875,124 B2 | 10/2014 | Kuzmack et al. | |
| 8,984,240 B2 | 3/2015 | Aslot et al. | |
| 9,032,122 B2 | 5/2015 | Hart et al. | |
| 9,047,113 B2 | 6/2015 | Iwamatsu et al. | |
| 9,304,849 B2 | 4/2016 | Arroyo et al. | |
| 9,552,233 B1* | 1/2017 | Tsirkin | G06F 9/5088 |
| 2002/0083258 A1 | 6/2002 | Bauman et al. | |
| 2003/0204648 A1* | 10/2003 | Arndt | G06F 9/544 |
| | | | 710/5 |
| 2004/0064601 A1* | 4/2004 | Swanberg | G06F 13/28 |
| | | | 710/22 |
| 2004/0205272 A1 | 10/2004 | Armstrong et al. | |
| 2007/0157197 A1 | 7/2007 | Neiger et al. | |
| 2007/0260768 A1 | 11/2007 | Bender et al. | |
| 2008/0005383 A1 | 1/2008 | Bender et al. | |
| 2008/0114916 A1 | 5/2008 | Hummel et al. | |
| 2008/0147887 A1 | 6/2008 | Freimuth et al. | |
| 2009/0249366 A1 | 10/2009 | Sen et al. | |
| 2010/0036995 A1 | 2/2010 | Nakayama et al. | |
| 2010/0250824 A1 | 9/2010 | Belay | |
| 2010/0262727 A1* | 10/2010 | Arndt | G06F 13/28 |
| | | | 710/22 |
| 2011/0197003 A1 | 8/2011 | Serebrin et al. | |
| 2011/0320860 A1 | 12/2011 | Coneski et al. | |
| 2012/0042034 A1 | 2/2012 | Goggin et al. | |
| 2012/0131576 A1* | 5/2012 | Hatta | G06F 9/5077 |
| | | | 718/1 |
| 2012/0137288 A1 | 5/2012 | Barrett et al. | |
| 2012/0137292 A1 | 5/2012 | Iwamatsu et al. | |
| 2012/0167082 A1 | 6/2012 | Kumar et al. | |
| 2013/0086298 A1* | 4/2013 | Alanis | G06F 9/4856 |
| | | | 711/6 |
| 2013/0159572 A1 | 6/2013 | Graham et al. | |
| 2013/0191821 A1 | 7/2013 | Armstrong et al. | |
| 2014/0149985 A1 | 5/2014 | Takeuchi | |
| 2014/0281263 A1 | 9/2014 | Deming et al. | |
| 2014/0351471 A1 | 11/2014 | Jebson et al. | |
| 2014/0372739 A1 | 12/2014 | Arroyo et al. | |
| 2015/0052282 A1* | 2/2015 | Dong | G06F 13/32 |
| | | | 710/308 |
| 2015/0120969 A1 | 4/2015 | He et al. | |
| 2015/0193248 A1* | 7/2015 | Noel | G06F 9/45558 |
| | | | 718/1 |
| 2015/0193250 A1* | 7/2015 | Ito | G06F 9/4856 |
| | | | 718/1 |
| 2015/0229524 A1 | 8/2015 | Engebretsen et al. | |
| 2016/0246540 A1 | 8/2016 | Blagodurov et al. | |
| 2017/0046184 A1* | 2/2017 | Tsirkin | G06F 9/45558 |

OTHER PUBLICATIONS

PCI-SIG, "Single Root I/O Virtualization and Sharing Specification—Revision 1.0", Sep. 2007, PCI-SIG Specifications Library, pcisig.com (online), URL: pcisig.com/specifications/iov/single_root/.

Axnix et al. "IBM z13 firmware innovations for simultaneous multithreading and I/O virtualization", IBM Journal of Research and Development, Jul./Sep. 2015, vol. 59, No. 4/5, 11-1, International Business Machines Corporation (IBM), Armonk, NY.

Salapura et al., "Resilient cloud computing", IBM Journal of Research and Development, Sep./Oct. 2013, vol. 57, No. 5, 10-1, 12 pages, International Business Machines Corporation (IBM), Armonk, NY.

Challa, "Hardware Based I/O Virtualization Technologies for Hypervisors, Configurations and Advantages—A Study", 2012 IEEE International Conference on Cloud Computing in Emerging Markets (CCEM), Oct. 2012, pp. 99-103, IEEE Xplore Digital Library (online), DOI: 10.1109/CCEM.2012.6354610.

Xu et al., "Multi-Root I/O Virtualization Based Redundant Systems", 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS. 2014.7044652.

AUS920160387US1, Appendix P; List of IBM Patent or Applications Treated as Related, Jan. 4, 2017, 2 pages.

\* cited by examiner

US 9,760,512 B1

MIGRATING DMA MAPPINGS FROM A SOURCE I/O ADAPTER OF A SOURCE COMPUTING SYSTEM TO A DESTINATION I/O ADAPTER OF A DESTINATION COMPUTING SYSTEM

BACKGROUND

Field of the Invention

The field of the invention is data processing, or, more specifically, methods, apparatus, and products for migrating DMA mappings.

Description of Related Art

A logical partition may be configured to utilize a physical, rather than virtual, I/O adapter. Such a configuration may rely on direct memory access operations between the I/O adapter. In current server-class systems there are large I/O fabrics incorporating many layers of bridge chips, switches, and I/O devices. The I/O devices themselves may be further virtualized in technologies such as SR-IOV. DMA requests generated by an I/O device must properly access only the appropriate memory for the owning logical partition (LPAR) for that I/O device.

The mapping of DMA addresses to LPAR memory involves an I/O translation table and associated hardware, often called an I/O Memory Management Unit (IO MMU) with the particular mappings of physical memory to PCI DMA addresses known as Translation Control Entries (TCEs). Setting up the TCE tables involves both hardware configuration and software configuration across many layers of the system including the hypervisor and the logical partition. The logical partition calls to the hypervisor to map LPAR memory pages to a DMA address, and can then inform the I/O adapter of the DMA address or addresses that the I/O adapter can use for operation. Any changes to these relationships require the updated configuration mappings to be communicated across all parties. This limits both configuration flexibility and the ability to reconfigure (for example, due to hardware failure or resource movement).

SUMMARY

Methods, apparatus, and products for migrating direct memory access ('DMA') mappings from a source input/output ('I/O') adapter of a source computing system to a destination I/O adapter of a destination computing system are disclosed in this specification. Such DMA migration includes: collecting, by a source hypervisor of the source computing system, DMA mapping information, where the source hypervisor supports operation of a logical partition executing on the source computing system and the logical partition is configured for DMA operations with the source I/O adapter utilizing the DMA mapping information; configuring, by a destination hypervisor of the destination computing system, the destination I/O adapter with DMA mappings based on the DMA mapping information collected by the source hypervisor; placing, by the destination hypervisor, the destination I/O adapter in an error state; migrating the logical partition from the source computing system to the destination computing system; and restarting the logical partition on the destination computing system, including recovering, by the logical partition, from the error state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
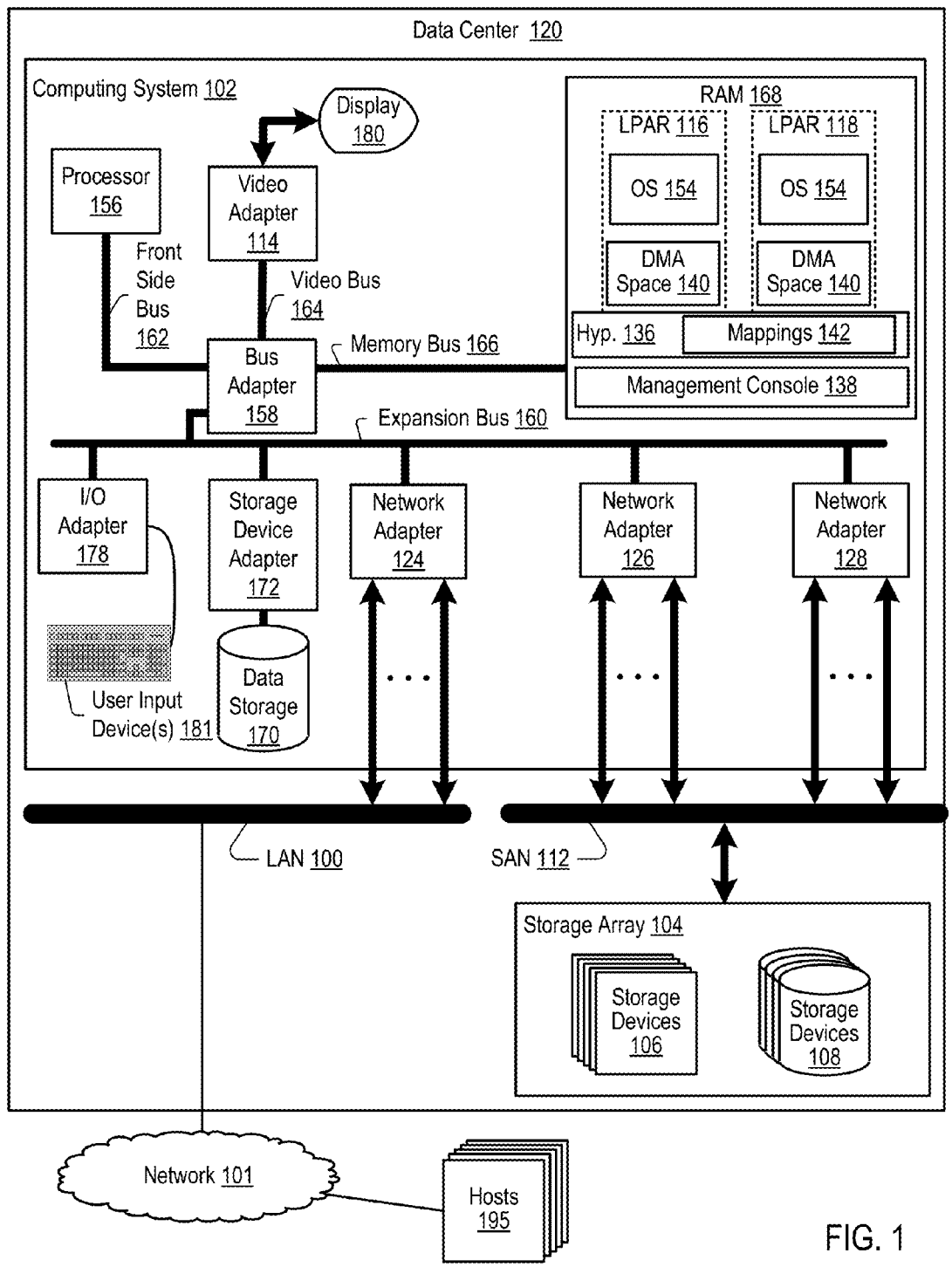
FIG. 1 sets forth an example system configured for migrating DMA mappings according to embodiments of the present invention.

Embodiments of methods, apparatus, and computer program products for migrating DMA mappings from a source I/O adapter of a source computing system to a destination I/O adapter of a destination computing system are described with reference to the accompanying drawings, beginning with FIG. 1. FIG. 1 sets forth an example system configured for migrating DMA mappings according to embodiments of the present invention. The example of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for migrating DMA mappings from a source I/O adapter to a destination I/O adapter according to embodiments of the present invention. One example type of I/O adapter that may be configured for such DMA mapping migration is an SR-IOV adapter. Readers will recognize that such SR-IOV adapters are only an example of a type of I/O adapter and that many different types of I/O adapters may be configured for DMA mapping migration according to embodiments of the present invention. SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition.

The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients. The management console (138) may also administer the migration of the logical partition from the source computing system to the destination computing system.

Also stored in RAM (168) are two instances of an operating system (154), one for each logical partition (116, 118). Operating systems useful in computers configured for DMA mapping migration according to various embodiments include UNIX™, Linux™, Microsoft Windows™, AIX™, IBM's I™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware.

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for DMA mapping migration according to various embodiments include Integrated Drive Electronics ("IDE") adapters, Small Computing system Interface ("SCSI") adapters, and others as will occur to those of skill in the art. Non-volatile computer memory also may be implemented as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (104) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for DMA mapping migration according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices, such as storage devices (106) and storage devices (108).

From time to time and for various reasons, a logical partition may be migrated from one computing system to another computing system, such as a host (195). In prior art embodiments in which the logical partition is coupled to an I/O adapter through a physical communication channel (rather than an entirely virtualized communications channel), the I/O adapter must be deconfigured from the logical partition completely prior to migration. Once migrated to the destination computing system an I/O adapter would be added to the logical partition as if a new adapter were added to the system. Further, in some embodiments, the logical partition and I/O adapter have mapped a memory space (140) utilized by the LPAR and the I/O adapter for DMA communications. In some embodiments, the logical partition may make a hypervisor call to map or unmap DMA memory for a particular I/O adapter. The hypervisor in the example of FIG. 1 maintains such DMA mappings (142) and the memory (140) that has been mapped for such a purpose. To that end, the computing system (102) of FIG. 1 may be configured for DMA mapping migration from a source computing system to a destination computing system. The hypervisor (136), in conjunction with the hypervisor of the destination computing system, may carry out the DMA mapping migration by: collecting, by the source hypervisor (136) of the source computing system (102), DMA mapping information (142), where the source hypervisor (136) supports operation of a logical partition (116) executing on the source computing system and the logical partition (116) is configured for DMA operations with the source I/O adapter utilizing the DMA mapping information (142); configuring, by a destination hypervisor (not shown in FIG. 1) of the destination computing system (one of the hosts (195), for example), the destination I/O adapter with DMA mappings based on the DMA mapping information collected by the source hypervisor; placing, by the destination hypervisor, the destination I/O adapter in an error state; migrating the logical partition from the source computing system to the destination computing system; and restarting the logical partition on the destination computing system, including recovering, by the logical partition, from the error state.

Examples of such an I/O adapter may be the network adapters (124, 126, and 128) of FIG. 1. The network adapters (124, 126, and 128) are for purposes of illustration, not for limitation. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
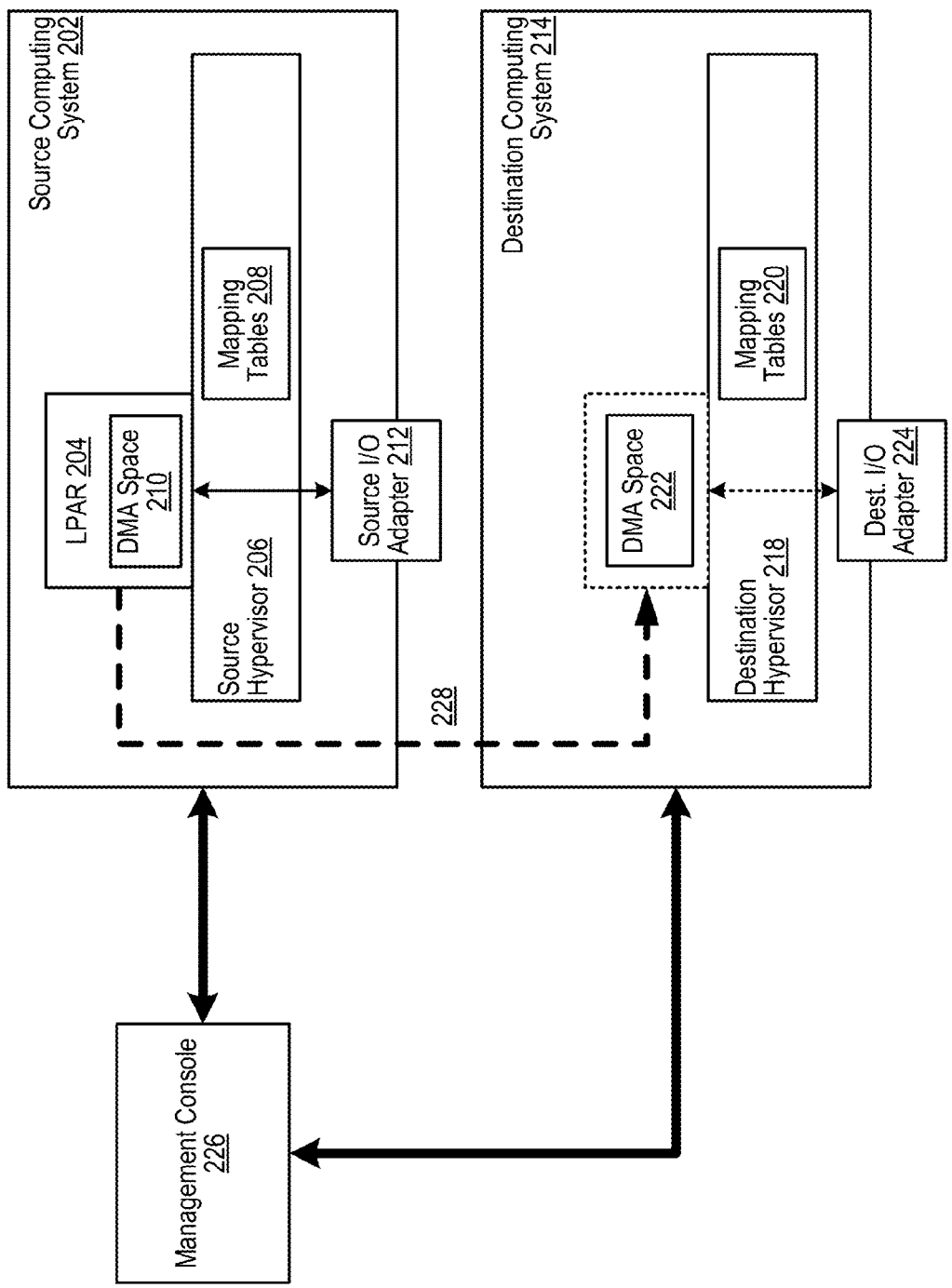
FIG. 2 sets forth a functional block diagram of an example system configured for DMA mapping migration according to embodiments of the present invention.

For further explanation, FIG. 2 sets forth a functional block diagram of an example system configured for DMA mapping migration according to embodiments of the present invention. The example system of FIG. 2 includes a management console (226). A management console may be implemented as a module of automated computing machinery comprising computer hardware and software. The management console (226) may be coupled to a source computing system (202) and a destination computing system (214) through various networking devices, protocols, and fabrics. The management console may provide a user interface through which a user may direct a hypervisor on instantiating and maintaining logical partitions, where each logical partition may provide virtualization services to one or more clients. The management console (226) may also direct hypervisors to migrate logical partitions from one computing system to another computing system.

In the example of FIG. 2, the source computing system (202) is a computing system similar that depicted in the example of FIG. 1. The term 'source' is used here solely to denote that the computing system is the origin of a migration of DMA mappings. Likewise, the destination computing system (214) in the example of FIG. 2 may be a computing system similar to that depicted in the example of FIG. 1 and the term 'destination' is utilized merely to indicate that the computing system is a target of a migration of DMA mappings.

The example source computing system (202) of FIG. 2 include a source hypervisor (206) that supports execution of at least one logical partition (204). The logical partition is coupled to a source I/O adapter (212) for I/O operations. The logical partition (204) has mapped, through one or more hypervisor calls, logical partition memory as a DMA space (210) for use in DMA operations with the source I/O adapter (212). Upon each mapping, unmapping, and modification of a mapped memory for use in DMA operations, the source hypervisor updates the mapping tables (208). Although explained in greater detail below with respect to FIG. 3, when the logical partition maps a memory space, say four pages at 4 KB each, the hypervisor provides the logical partition with a memory address to use in DMA operations targeting the mapped memory space (210). From the logical partition's perspective, the addresses are real physical addresses. In reality, the addresses are logical addresses. Such logical addresses are stored, in general, in one or more tables and each logical address is mapped to a real memory address. Such tables are accessible by an I/O memory management unit (IOMMU), which is not shown for purposes of simplicity, when used in DMA operations between the I/O adapter (212) and the logical partition (204).

For further explanation, consider an example DMA operation between the source I/O adapter (212) and the logical partition (204). When the source I/O adapter (212) attempts to store data in the DMA space (210) mapped for such a purpose, the source I/O adapter (212) issues a PUT command on an I/O fabric coupling the LPAR, the IOMMU, and the source I/O adapter. The PUT command includes, among other attributes, the logical address of the DMA memory space (210). The IOMMU snoops the DMA PUT command from the I/O fabric, translates the logical address to a real address, and moves the subject data of the DMA PUT command from the data's current location into the physical memory addressed by the real address. The IOMMU may set a flag in a DMA queue which indicates, to the logical partition, that data is ready to be retrieved from the DMA space.

This is just one example, with minimal detail regarding translation. The example highlights, however, that the address provided to the logical partition in response to mapping a memory space for DMA operations, is not a real address, even though the logical partition and the source I/O adapter believe the address to be real.

In the example of FIG. 2, the management console (226) initiates a logical partition migration. One example of a logical partition migration is called live partition mobility in which the logical partition is migrated while in operation, without a full shutdown and restart of the operating system of the logical partition. One obstacle to such live migrations in the prior art is the existence of DMA mappings between the logical partition to be moved and a source I/O adapter. In prior art systems, the source I/O adapter, must be deconfigured from the system, essentially removing all DMA mappings entirely, prior to the logical partition being migrated. Upon restarting the logical partition on the destination computing system, a new I/O adapter would be added to the system and the logical partition would be required to create all new DMA mappings for the new I/O adapter.

By contrast, the system of FIG. 2 is configured for DMA mapping migration according to embodiments of the present invention. The management console (226) may orchestrate the migration (228) of the logical partition (204) from the source computing system (202) to the destination computing system by first instructing the source hypervisor (206) to prepare for migration. The source hypervisor (206), among other operations to prepare for the logical partition's (204) migration, may collect DMA mapping information, such as the information stored within the mapping tables (208). In embodiments in which the I/O adapter is implemented as a PCI express (PCIe) adapter, the DMA mapping information may include one or more data structures specifying: a size of a range allocated to the PCIe device for DMA operations; data from a PCIe configuration space including a requester identifier of the PCIe adapter; and a logical addresses to physical memory address mappings, where each mapping represents a memory page and each mapping includes access permissions for the memory page. The source hypervisor may provide such collected DMA mapping information to the management console or open a communication channel to the destination computing system (214) to provide such collected DMA mapping information.

The management console (226) may then instruct the destination hypervisor to prepare for migration. The destination hypervisor (218) may, among other preparations, configure the destination I/O adapter with DMA mappings (220) based on the DMA mapping information collected by the source hypervisor (206). Such DMA mappings (220) may target the DMA space (222).

The management console may then instruct the destination hypervisor to place the destination I/O adapter in an error state. Such an error state may include the 'EEH' (enhanced error handling) error state which is an extension to the PCI standard specification and enabled in systems running IBM's Power™ Processors. The management console may then instruct the source computing system to migrate the logical partition to the destination computing system; and restart the logical partition on the destination computing system. Upon restarting the logical partition, the logical partition will discover that data communications with the I/O adapter have been interrupted and will recover from the error state. Such recovery may cause the destination I/O adapter to be restarted, then complete a handshake with the logical partition (204) to continue I/O operations. The logical partition (204) is generally unaware that the destination I/O adapter (224) is not the source I/O adapter (224) and may continue to issue DMA commands directed to the destination I/O adapter utilizing the same logical addresses provided to the logical partition when the logical partition mapped a DMA space (210) on the source computing system (202).

As mentioned above, in some embodiments, specifically in embodiments in which the I/O adapter is implemented as a PCIe adapter or SR-IOV adapter, the DMA mapping information collected by the source hypervisor and utilized to update mapping information on the destination computing system may be implemented as one or more data structures specifying: a size of a range allocated to the PCIe device for DMA operations; data from a PCIe configuration space including a requester identifier of the PCIe adapter; and a logical addresses to physical memory address mappings, where each mapping represents a memory page and each mapping includes access permissions for the memory page. For further explanation, therefore, FIG. 3 sets forth a set of example DMA mapping data structures in the form of several tables.

Figure 3:
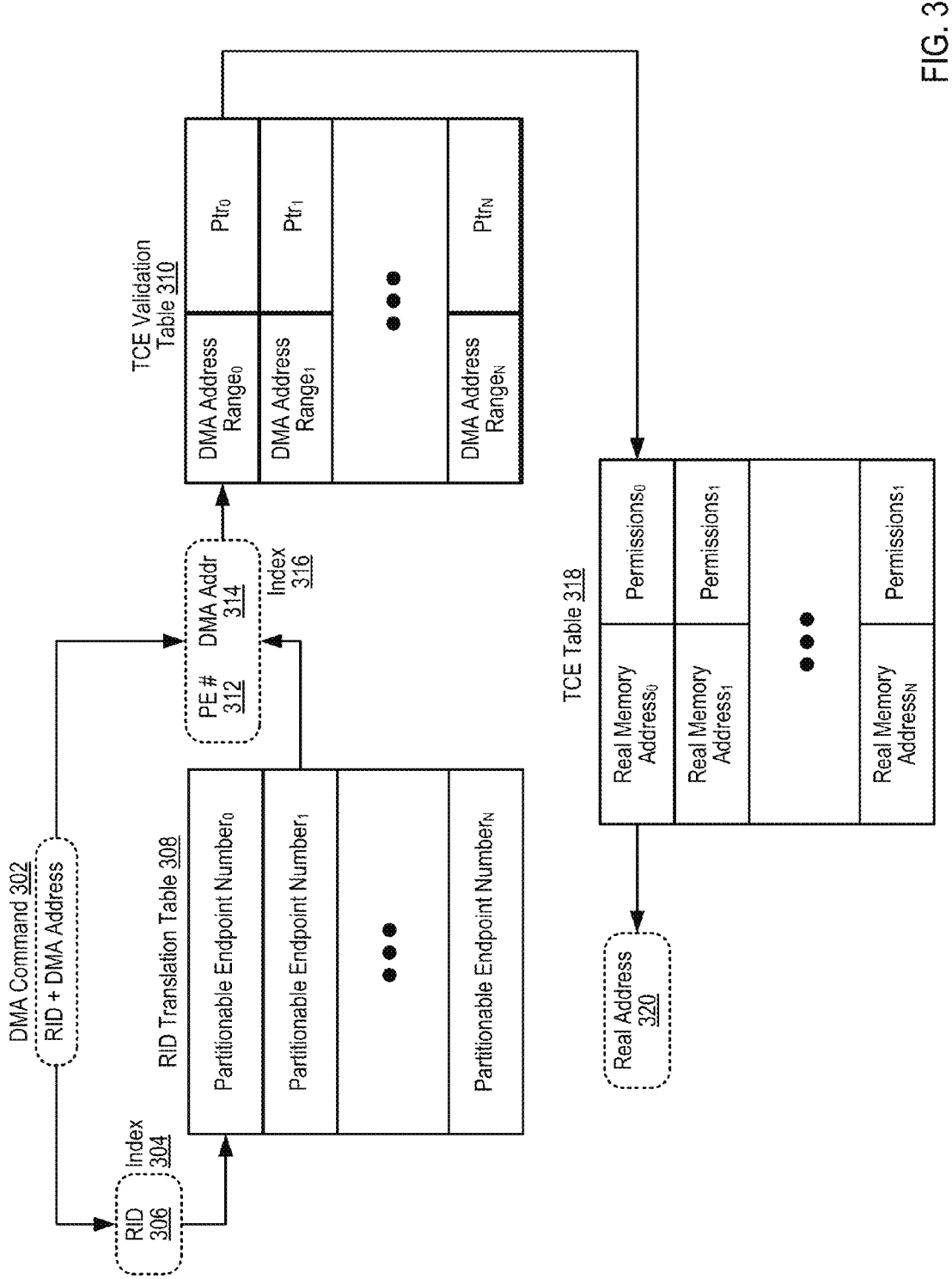
FIG. 3 sets forth a set of example DMA mapping data structures in the form of several tables.

The example of FIG. 3 includes an RID translation table (308). An RID as the term is used here refers to a requester identifier, also sometimes referred to as a configuration space address. In PCI-express architectures, each PCI device under a root complex is uniquely identified by an RID. The RID may be a triplet of a bus number, device number, and function number. Such attributes may be located in the configuration space of a PCI adapter. The RID may be used to control access to memory or other resources in the system. That is, a PCI host bridge or IOMMU may confirm, for each, access to a memory location by an I/O adapter that the I/O adapter is allowed access to such memory location based in part on the RID of the I/O adapter.

In the example of FIG. 3, a DMA command (302) issued on the I/O bus includes an RID and a DMA address (314), among other attributes. The DMA address is a logical address as established by the hypervisor upon mapping a DMA space. As mentioned above, however, from the perspective of the logical partition and the I/O adapter, the DMA address is a real memory address.

The RID (306) included in the example command is used as an index (304) into the RID translation table (308). The RID translation table includes a number of entries, with each entry including a partitionable endpoint number (312). A partitionable endpoint or "PE" as the term is used in this specification refers to a logical identifier of any component or subcomponent of an I/O subsystem that can be allocated to a logical partition independently of any other component or subcomponent of the I/O subsystem. For example, some PEs may comprise a plurality of I/O adapters and I/O fabric components that function together and, thus, are allocated as a unit to a single logical partition. Another PE, however, may comprise a portion of a single I/O adapter, for example, a separately configurable and separately assignable port of a multi-port I/O adapter. In general, a PE is identified by its function rather than by its structure. Use of such PE's enables isolation of I/O resources between logical partitions.

The partitionable endpoint number identified from the table through the index (304) of the RID (306), is then used along with the DMA address (314) from the DMA command (302) as index (316) into a TCE validation table ('TVT') (310). In some embodiments, there is one TVT (310) for each partitionable endpoint. TCE or "translation control entry" refers to an entry in a TCE table discussed below in greater detail. Each entry in the TCE validation table (310) of FIG. 3 includes a DMA address range and a pointer to an entry in the TCE table (318). There may exist multiple different DMA address ranges in the TCE validation table (310) for the particular PE. Consider for example that a logical partition has mapped three distinct DMA memory ranges for use in DMA operations between a single PE. In such an example, the TCE validation table for that PE will include three separate entries. The DMA address (314) of the DMA command is then used to identify the correct entry by locating the entry that includes the DMA address range that encompasses the DMA address (314).

The pointer of the entry that matches the index (316) identifies an entry in the TCE table (318) that represents the first memory page at the beginning of the DMA address range. Each entry in the TCE table (318) may represent a particular size, such a 4 KB page of memory. As such, the DMA address (314) may be used as an offset relative to the memory address represented by the entry pointed to by the pointer of the TCE validation table (310). Each entry includes a real memory address and access permissions such as read, write, or no permissions. The output of the TCE table is a real address (320) which may be used to perform the DMA command (302) and the access permissions associated with the RID (306).

Readers of skill in the art will recognize that the tables set forth above are examples only and not a limitation. In some embodiments, fewer or more tables may be implemented to store DMA mappings between a logical partition and an I/O device. Further, the entries in each table may have fewer or greater attributes than those depicted here.

To collect DMA mapping information for later DMA mapping migration in a system that includes tables such as those set forth in the example, the hypervisor of the system collects all DMA addresses ranges for the partitionable endpoint that matches the RID of the I/O adapter, the real memory addresses that map to the DMA addresses ranges, and permissions. The hypervisor of the destination computing system, in configuring the destination I/O adapter with DMA mappings, may establish or modify similar tables, associate the RID of destination I/O adapter with a partitionable endpoint that indexes into entries of the TCE validation table having the same DMA address ranges (logical addresses) that were present in the source computing system, and create entries in the TCE table for the same number of memory pages that existed on the source computing system along with the associated permissions for each such page.

Figure 4:
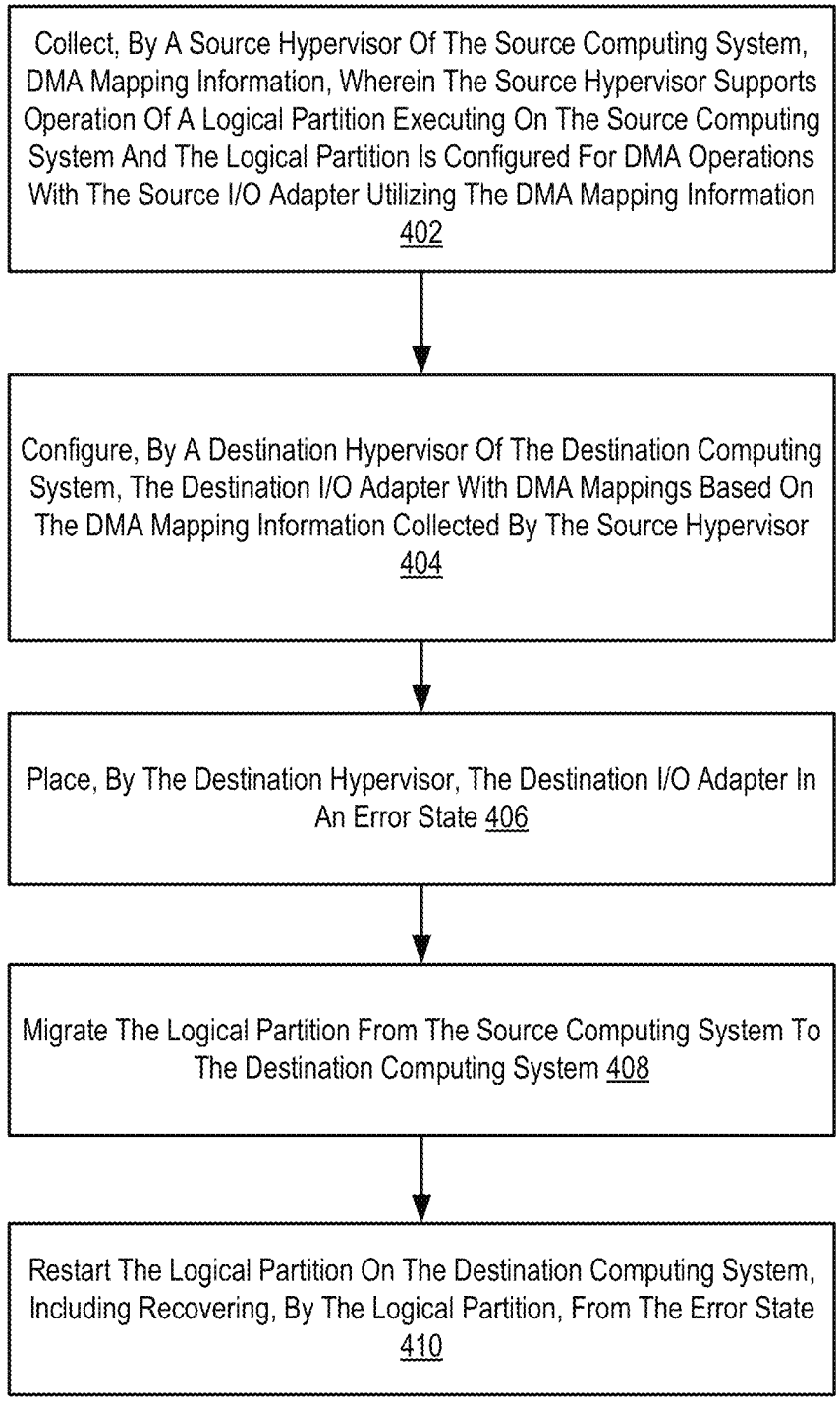
FIG. 4 sets forth a flow chart illustrating an exemplary method for migrating DMA mappings from a source I/O adapter of a source computing system to a destination I/O adapter of a destination computing system according to embodiments of the present invention.

For further explanation, FIG. 4 sets forth a flow chart illustrating an exemplary method for migrating DMA mappings from a source I/O adapter of a source computing system to a destination I/O adapter of a destination computing system according to embodiments of the present invention. The source hypervisor supports operation of a logical partition executing on the source computing system and the logical partition is configured for DMA operations with the source I/O adapter. The method of FIG. 4 includes collecting (402), by a source hypervisor of the source computing system, DMA mapping information. The DMA mapping information may include logical addresses, the total amount of address space for each mapped DMA memory region, and any permissions associated with those DMA memory regions. Collecting (402) such information may be carried out by gathering various entries in mapping tables designated for such purpose.

The method of FIG. 4 also includes configuring (404), by a destination hypervisor of the destination computing system, the destination I/O adapter with DMA mappings based on the DMA mapping information collected by the source hypervisor. Configuring (404) the destination I/O adapter with such DMA mappings may include creating or modifying existing mapping tables to reflect that the destination I/O adapter is taking the place of the source I/O adapter. Such modification may include establishing a PE number for the destination I/O adapter, associating the PE number of the destination I/O adapter with the same DMA address ranges (logical addresses) from the source computing system, and setting the same permissions for real addresses (which need not be the same as the source computing system) that map to the DMA address ranges.

The method of FIG. 4 also includes placing (406), by the destination hypervisor, the destination I/O adapter in an error state. In this state, the destination I/O adapter will attempt to reestablish connection with a logical partition. At this time, however, the logical partition has not been fully migrated from the source computing system to the destination computing system.

To that end, the method of FIG. 4 also includes migrating (408) the logical partition from the source computing system to the destination computing system. Migrating (408) the logical partition from the source computing system to the destination computing system may be carried out by placing the source I/O adapter in an error state thus disrupting I/O communications between the source I/O adapter and the logical partition. Then, the source hypervisor may quiesce the logical partition, ceasing all operations. Then, the logical partition may be copied from the source computing system to the destination computing system.

Finally, the method of FIG. 4 continues by restarting (410) the logical partition on the destination computing system. In the example of FIG. 4, restarting (410) the logical partition also includes recovering (410), by the logical partition, from the error state. That is, upon restart, the logical partition is generally unaware that the source I/O adapter is unavailable. Instead, the logical partition is operating as if communication has merely been interrupted due to error. As such, the logical partition attempts to recover from that error. Because the destination I/O adapter has been placed in the same state and is configured to communicate with the logical partition, the logical partition and the destination I/O adapter will establish a data communications connection as if the logical partition is merely re-establishing a previous connection. The logical partition and destination I/O adapter may then perform I/O communications with DMA operations.

Figure 5:
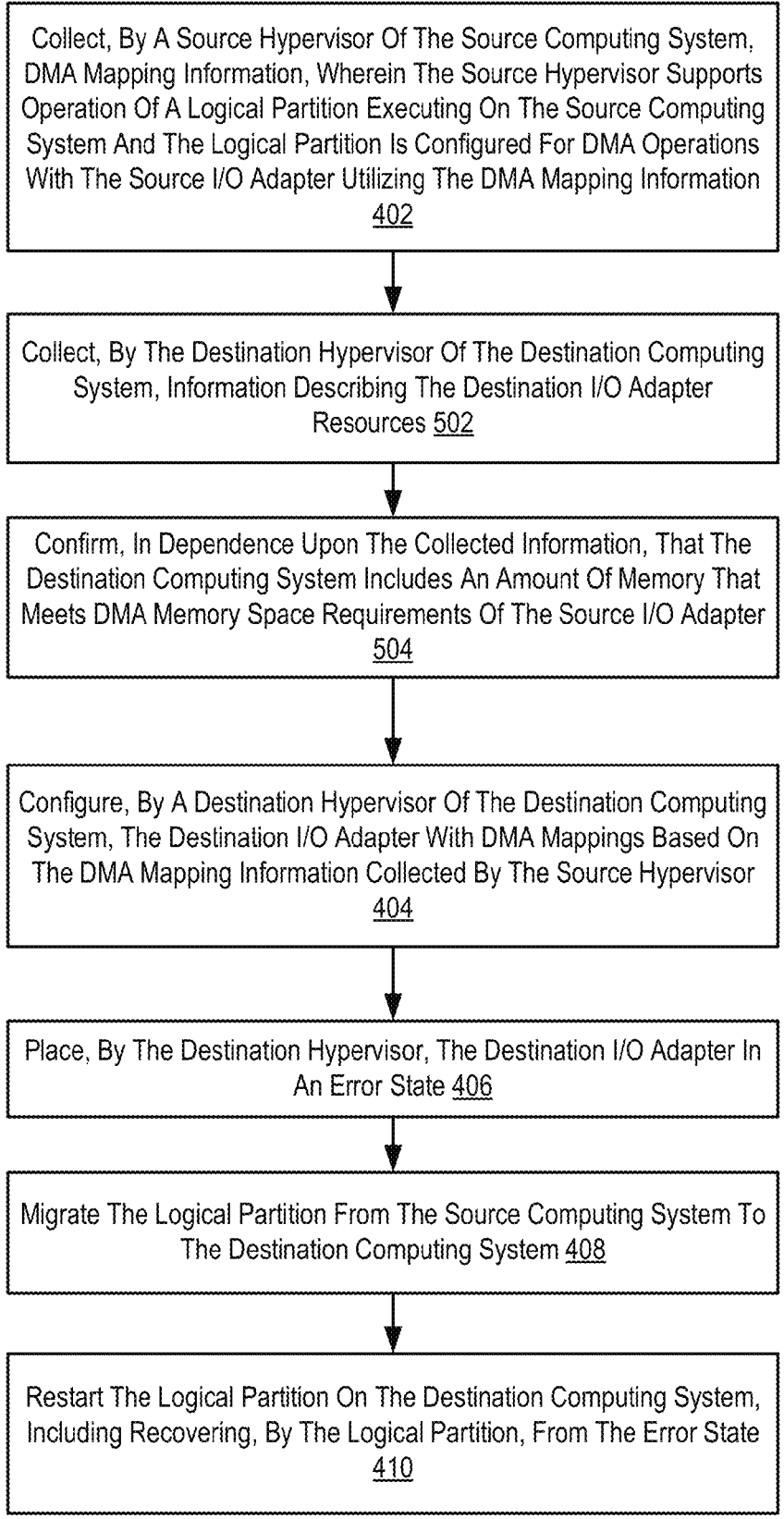
FIG. 5 sets forth a flow chart illustrating a further exemplary method for DMA mapping migration according to embodiments of the present invention.

For further explanation, FIG. 5 sets forth a flow chart illustrating a further exemplary method for DMA mapping migration according to embodiments of the present invention. The method of FIG. 5 is similar to the method of FIG. 4 in that the method of FIG. 5 is carried out in a system that includes a source computing system and a destination computing system. The source computing system includes a source hypervisor that supports operation of a logical partition execution on the source computing system. The source computing system also includes a source I/O adapter that is coupled to the logical partition for I/O data communications with DMA operations. The method of FIG. 5 is also similar to the method of FIG. 4 in that the method of FIG. 5 includes: collecting (402), by a source hypervisor of the source computing system, DMA mapping information; configuring (404), by a destination hypervisor of the destination computing system, the destination I/O adapter with DMA mappings based on the DMA mapping information collected by the source hypervisor; placing (406), by the destination hypervisor, the destination I/O adapter in an error state; migrating (408) the logical partition from the source computing system to the destination computing system; and restarting (410) the logical partition on the destination computing system, including recovering, by the logical partition, from the error state.

The method of FIG. 5 differs from the method of FIG. 4 in that the method of FIG. 5 includes collecting (502), by the destination hypervisor of the destination computing system, information describing the destination I/O adapter resources and confirming (504), in dependence upon the collected information, that the destination computing system includes an amount of memory that meets DMA memory space requirements of the source I/O adapter. The destination computing system may be configured with a finite amount of memory or a preconfigured amount of memory available for mapping to DMA space. To that end, the destination hypervisor, prior to migration of the logical partition and the DMA mappings of the logical partition, may confirm that space is available for the DMA mappings to be transferred. If the space is not available, the destination hypervisor may inform the management console which may, in turn, inform a user of such constraint of resources. The user may then reconfigure the destination computing system with additional memory for DMA or select another destination computing system to migrate the logical partition.

Figure 6:
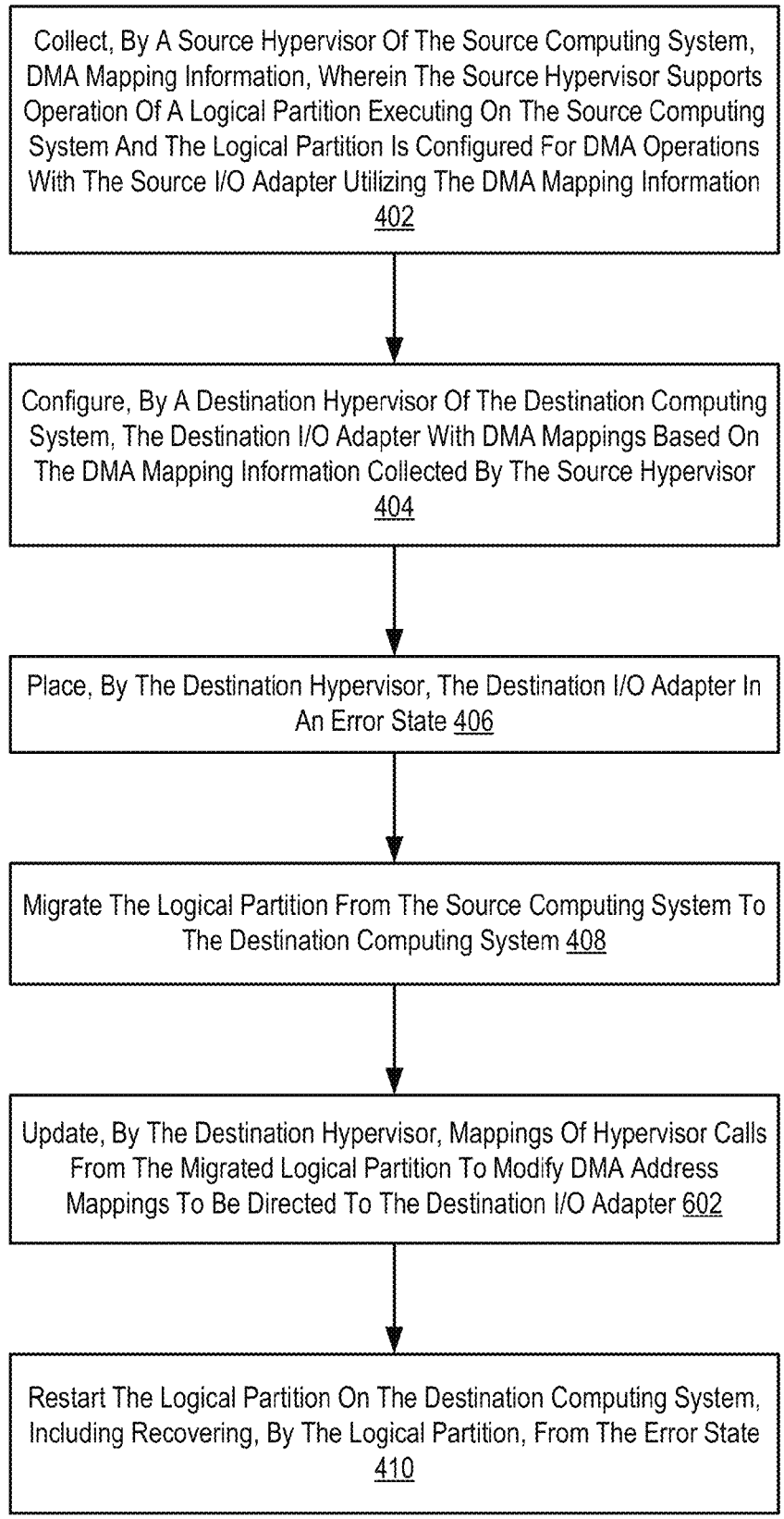
FIG. 6 sets forth a flow chart illustrating a further exemplary method for DMA mapping migration according to embodiments of the present invention.

For further explanation, FIG. 6 sets forth a flow chart illustrating a further exemplary method for DMA mapping migration according to embodiments of the present invention. The method of FIG. 6 is similar to the method of FIG. 4 in that the method of FIG. 6 is carried out in a system that includes a source computing system and a destination computing system. The source computing system includes a source hypervisor that supports operation of a logical partition execution on the source computing system. The source computing system also includes a source I/O adapter that is coupled to the logical partition for I/O data communications with DMA operations. The method of FIG. 6 is also similar to the method of FIG. 4 in that the method of FIG. 6 includes: collecting (402), by a source hypervisor of the source computing system, DMA mapping information; configuring (404), by a destination hypervisor of the destination computing system, the destination I/O adapter with DMA mappings based on the DMA mapping information collected by the source hypervisor; placing (406), by the destination hypervisor, the destination I/O adapter in an error state; migrating (408) the logical partition from the source computing system to the destination computing system; and restarting (410) the logical partition on the destination computing system, including recovering, by the logical partition, from the error state.

The method of FIG. 6 differs from the method of FIG. 4 in that the method of FIG. 6 also includes updating (602), by the destination hypervisor, mappings of hypervisor calls from the migrated logical partition to modify DMA address mappings to be directed to the destination I/O adapter. As mentioned above, to map or unmap DMA address space for the I/O adapter, the logical partition makes calls to the hypervisor. Such calls on the source computing system may be made by use of the RID of the source I/O adapter. That is, a call to map or unmap memory space may be formulated by the logical partition with the RID of the source I/O adapter. Because the source I/O adapter will no longer be present after migration, the source I/O adapter's RID will not be recognized by the destination hypervisor. To that end, the destination hypervisor may create or manage a table that includes an entry that associates the source I/O adapter's RID with the destination I/O adapter's RID. When a call is received by the destination hypervisor to map or unmap a memory region for DMA operations and that call includes the source I/O adapter's RID, the destination hypervisor may translate the source I/O adapter's RID to the destination adapter's RID utilizing the table.

Figure 7:
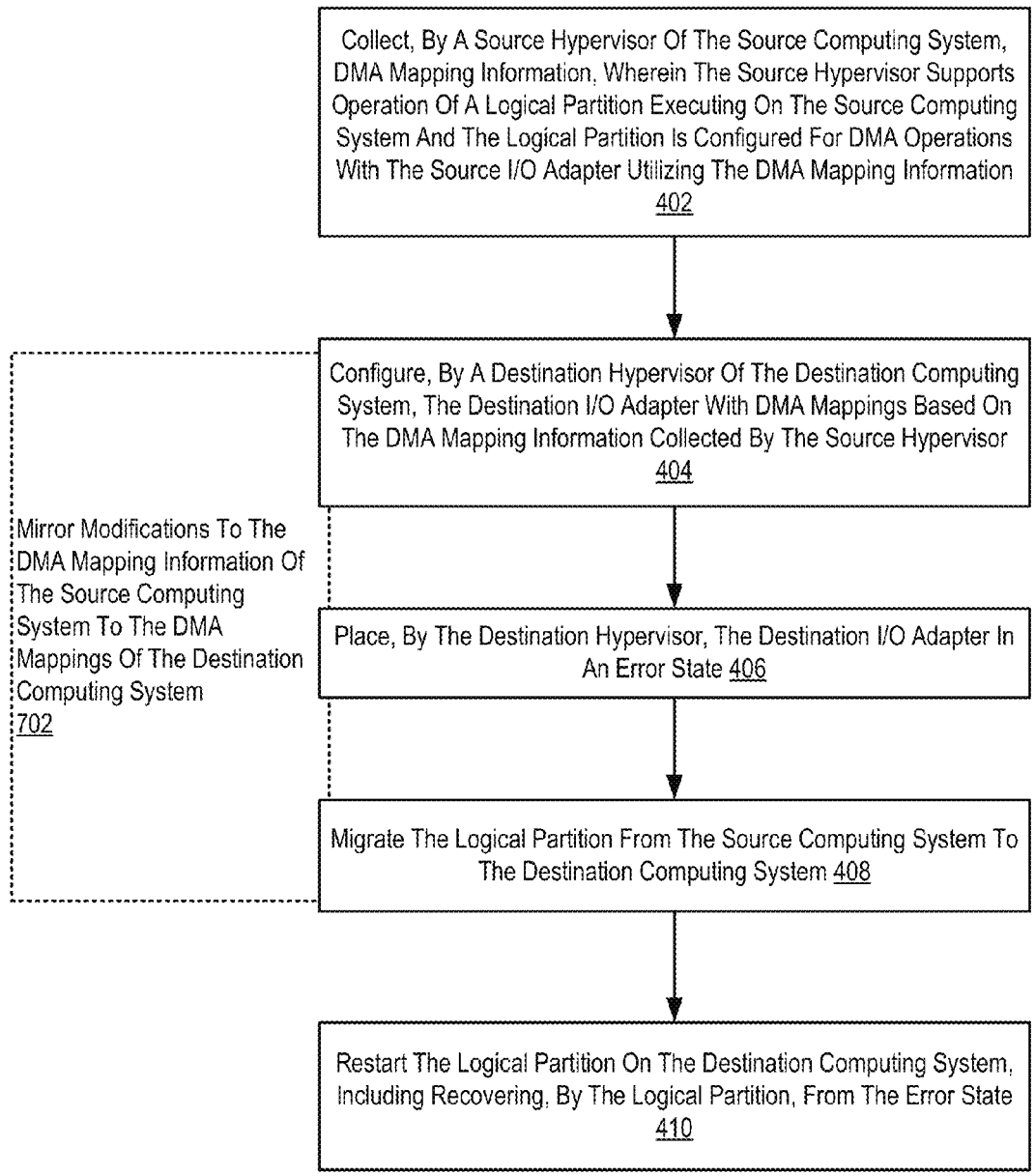
FIG. 7 sets forth a flow chart illustrating a further exemplary method for DMA mapping migration according to embodiments of the present invention.

For further explanation, FIG. 7 sets forth a flow chart illustrating a further exemplary method for DMA mapping migration according to embodiments of the present invention. The method of FIG. 7 is similar to the method of FIG. 4 in that the method of FIG. 7 is carried out in a system that includes a source computing system and a destination computing system. The source computing system includes a source hypervisor that supports operation of a logical partition execution on the source computing system. The source computing system also includes a source I/O adapter that is coupled to the logical partition for I/O data communications with DMA operations. The method of FIG. 7 is also similar to the method of FIG. 4 in that the method of FIG. 7 includes: collecting (402), by a source hypervisor of the source computing system, DMA mapping information; configuring (404), by a destination hypervisor of the destination computing system, the destination I/O adapter with DMA mappings based on the DMA mapping information collected by the source hypervisor; placing (406), by the destination hypervisor, the destination I/O adapter in an error state; migrating (408) the logical partition from the source computing system to the destination computing system; and restarting (410) the logical partition on the destination computing system, including recovering, by the logical partition, from the error state.

The method of FIG. 7 differs from the method of FIG. 4 in that, prior to completing migration of the logical partition and during the configuration the destination I/O adapter with DMA mappings based on the DMA mapping information collected by the source hypervisor, the method of FIG. 7 includes mirroring (702) modifications to the DMA mapping information of the source computing system to the DMA mappings of the destination computing system. An appreciable amount of time may lapse between the initiation of a logical partition migration and the completion of such a migration. To reduce downtime of the logical partition, any changes to DMA mappings on the source computing system are mirrored on the destination computing system until the logical partition is quiesced and completely halted on the source computing system. Such mirroring may be carried out by communication directly between the source and destination hypervisor or through use of the management console. That is, for every call by the logical partition on the source computing system to map, unmap, or modify a memory space for DMA, the source hypervisor may either inform the destination hypervisor directly or inform the management console. In the case in which the source hypervisor informs the management console of such mapping modifications, the management console may either buffer the modifications until the logical partition has quiesced prior to migration or inform the destination hypervisor upon each modification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating direct memory access ('DMA') mappings from a source input/output ('I/O') adapter of a source computing system to a destination I/O adapter of a destination computing system, the method comprising:
   collecting, by a source hypervisor of the source computing system, DMA mapping information including collecting DMA address ranges for the source I/O adapter of the source computing system, wherein the source hypervisor supports operation of a logical partition executing on the source computing system and the logical partition is configured for DMA operations with the source I/O adapter utilizing the DMA mapping information;
   configuring, by a destination hypervisor of the destination computing system, the destination I/O adapter with DMA mappings based on the DMA mapping information collected by the source hypervisor including configuring the destination I/O adapter of the destination computing system with the DMA address ranges from the source I/O adapter on the source computing system;
   placing, by the destination hypervisor, the destination I/O adapter in an error state;
   migrating the logical partition from the source computing system to the destination computing system; and
   restarting the logical partition on the destination computing system, including recovering, by the logical partition, from the error state.

2. The method of claim 1 further comprising:
   collecting, by the destination hypervisor of the destination computing system, information describing the destination I/O adapter resources;
   confirming, in dependence upon the collected information, that the destination computing system includes an amount of memory that meets DMA memory space requirements of the source I/O adapter.

3. The method of claim 1 further comprising:
   updating, by the destination hypervisor, mappings of hypervisor calls from the migrated logical partition to modify DMA address mappings to be directed to the destination I/O adapter.

4. The method of claim 1 wherein:
   the source I/O adapter is a PCI express adapter;
   the DMA mapping information further comprises one or more data structures specifying:
   a size of a range allocated to the PCIe device for DMA operations;

data from a PCIe configuration space including a requester identifier of the PCIe adapter; and logical addresses to physical memory address mappings, wherein each mapping represents a memory page and each mapping includes access permissions for the memory page.

5. The method of claim 4 wherein the PCIe adapter further comprises a single-root I/O virtualization adapter.

6. The method of claim 1 further comprising, prior to completing migration of the logical partition and during the configuration the destination I/O adapter with DMA mappings based on the DMA mapping information collected by the source hypervisor, mirroring modifications to the DMA mapping information of the source computing system to the DMA mappings of the destination computing system.

7. The method of claim 1 wherein a management console is coupled to the source and destination computing systems and the method further comprises:
administering the migration of the logical partition from the source computing system to the destination computing system.

8. An apparatus for migrating direct memory access ('DMA') mappings from a source input/output ('I/O') adapter of a source computing system to a destination I/O adapter of a destination computing system, the apparatus comprising a computer processor, a computer memory operatively coupled to the computer processor, the computer memory having disposed within it computer program instructions that, when executed by the computer processor, cause the apparatus to carry out the steps of:
collecting, by a source hypervisor of the source computing system, DMA mapping information including collecting DMA address ranges for the source I/O adapter of the source computing system, wherein the source hypervisor supports operation of a logical partition executing on the source computing system and the logical partition is configured for DMA operations with the source I/O adapter utilizing the DMA mapping information;
configuring, by a destination hypervisor of the destination computing system, the destination I/O adapter with DMA mappings based on the DMA mapping information collected by the source hypervisor including configuring the destination I/O adapter of the destination computing system with the DMA address ranges from the source I/O adapter on the source computing system;
placing, by the destination hypervisor, the destination I/O adapter in an error state;
migrating the logical partition from the source computing system to the destination computing system; and
restarting the logical partition on the destination computing system, including recovering, by the logical partition, from the error state.

9. The apparatus of claim 8 further comprising computer program instructions that, when executed by the computer processor, cause the apparatus to carry out the steps of:
collecting, by the destination hypervisor of the destination computing system, information describing the destination I/O adapter resources;
confirming, in dependence upon the collected information, that the destination computing system includes an amount of memory that meets DMA memory space requirements of the source I/O adapter.

10. The apparatus of claim 8 further comprising computer program instructions that, when executed by the computer processor, cause the apparatus to carry out the step of:
updating, by the destination hypervisor, mappings of hypervisor calls from the migrated logical partition to modify DMA address mappings to be directed to the destination I/O adapter.

11. The apparatus of claim 8 wherein:
the source I/O adapter is a PCI express adapter;
the DMA mapping information further comprises one or more data structures specifying:
a size of a range allocated to the PCIe device for DMA operations;
data from a PCIe configuration space including a requester identifier of the PCIe adapter; and
logical addresses to physical memory address mappings, wherein each mapping represents a memory page and each mapping includes access permissions for the memory page.

12. The apparatus of claim 11 wherein the PCIe adapter further comprises a single-root I/O virtualization adapter.

13. The apparatus of claim 8 further comprising computer program instructions that, when executed by the computer processor, cause the apparatus, prior to completing migration of the logical partition and during the configuration the destination I/O adapter with DMA mappings based on the DMA mapping information collected by the source hypervisor, to carry out the step of mirroring modifications to the DMA mapping information of the source computing system to the DMA mappings of the destination computing system.

14. The apparatus of claim 8 wherein a management console is coupled to the source and destination computing systems and the method further comprises:
administering the migration of the logical partition from the source computing system to the destination computing system.

15. A computer program product for migrating direct memory access ('DMA') mappings from a source input/output ('I/O') adapter of a source computing system to a destination I/O adapter of a destination computing system, the computer program product disposed upon a non-transitory computer readable medium, the computer program product comprising computer program instructions that, when executed, cause a computer to carry out the steps of:
collecting, by a source hypervisor of the source computing system, DMA mapping information including collecting DMA address ranges for the source I/O adapter of the source computing system, wherein the source hypervisor supports operation of a logical partition executing on the source computing system and the logical partition is configured for DMA operations with the source I/O adapter utilizing the DMA mapping information;
configuring, by a destination hypervisor of the destination computing system, the destination I/O adapter with DMA mappings based on the DMA mapping information collected by the source hypervisor including configuring the destination I/O adapter of the destination computing system with the DMA address ranges from the source I/O adapter on the source computing system;
placing, by the destination hypervisor, the destination I/O adapter in an error state;
migrating the logical partition from the source computing system to the destination computing system; and
restarting the logical partition on the destination computing system, including recovering, by the logical partition, from the error state.

16. The computer program product of claim 15 further comprising computer program instructions that, when executed, cause the computer to carry out the steps of:

collecting, by the destination hypervisor of the destination computing system, information describing the destination I/O adapter resources;

confirming, in dependence upon the collected information, that the destination computing system includes an amount of memory that meets DMA memory space requirements of the source I/O adapter.

17. The computer program product of claim 15 further comprising computer program instructions that, when executed, cause the computer to carry out the step of:

updating, by the destination hypervisor, mappings of hypervisor calls from the migrated logical partition to modify DMA address mappings to be directed to the destination I/O adapter.

18. The computer program product of claim 15 wherein:
the source I/O adapter is a PCI express adapter;
the DMA mapping information further comprises one or more data structures specifying:
a size of a range allocated to the PCIe device for DMA operations;
data from a PCIe configuration space including a requester identifier of the PCIe adapter; and
logical addresses to physical memory address mappings, wherein each mapping represents a memory page and each mapping includes access permissions for the memory page.

19. The computer program product of claim 15 further comprising computer program instructions that, when executed, cause the computer, prior to completing migration of the logical partition and during the configuration the destination I/O adapter with DMA mappings based on the DMA mapping information collected by the source hypervisor, to carry out the step of mirroring modifications to the DMA mapping information of the source computing system to the DMA mappings of the destination computing system.

20. The computer program product of claim 15 wherein a management console is coupled to the source and destination computing systems and the method further comprises:

administering the migration of the logical partition from the source computing system to the destination computing system.

* * * * *